United States Patent
Delaurier

[19]

[11] Patent Number: 6,164,386
[45] Date of Patent: Dec. 26, 2000

[54] HARROW

[76] Inventor: Ronald T. Delaurier, Box 85, Laurier, Manitoba, Canada, R0J 1A0

[21] Appl. No.: 09/285,440

[22] Filed: Apr. 2, 1999

[51] Int. Cl.[7] .................................................. A01B 23/04
[52] U.S. Cl. ...................... 172/622; 172/705; 172/615; 172/621; 172/624; 172/633; 172/643; 172/707; 172/739
[58] Field of Search .................... 172/615, 619, 172/620, 621, 622, 623, 624, 626, 633, 634, 635, 643, 707, 706, 705, 739

[56] References Cited

U.S. PATENT DOCUMENTS

| | | | |
|---|---|---|---|
| 4,220,211 | 9/1980 | Hake ........................................ | 172/618 |
| 4,368,783 | 1/1983 | Hake et al. ............................. | 172/705 |
| 4,615,286 | 10/1986 | Linton ...................................... | 111/52 |
| 4,877,090 | 10/1989 | Gullickson ............................. | 172/102 |
| 5,044,449 | 9/1991 | Stirek et al. ............................ | 172/634 |
| 5,168,936 | 12/1992 | Stevens ................................... | 172/662 |
| 5,251,704 | 10/1993 | Bourgault et al. ...................... | 172/311 |
| 5,492,182 | 2/1996 | Delaurier ................................ | 172/615 |
| 5,622,229 | 4/1997 | Degelman ............................... | 172/621 |
| 5,862,764 | 1/1999 | Umemoto ............................... | 111/127 |
| 5,988,294 | 11/1999 | Hubscher ................................ | 172/453 |

*Primary Examiner*—Victor Batson
*Attorney, Agent, or Firm*—Adrian D. Battison; Murray E. Thrift

[57] ABSTRACT

A harrow is provided having an elongate tool bar mounted on wheels for movement in a forward direction perpendicular to the tool bar. A plurality of harrow elements are mounted on the tool bar to extend generally rearward therefrom. A pair of support arms are pivotally mounted on the tool bar at a first end and mount each harrow element on a second end towards a rearward end of the harrow element. A hanger is connected between the support arms and the harrow element towards a forward end of the harrow element for suspending the harrow element therefrom. A plurality of tines are mounted on the harrow element such that the angle of the tines relative to the ground may be adjusted. A coupling connects between the hanger and the tines such that the height of the front end of the harrow frame is adjusted in response to tine angle adjustment.

13 Claims, 4 Drawing Sheets

HARROW

FIELD OF THE INVENTION

This invention relates to a harrow of the type comprising an elongate tool bar supported on wheels for movement in a direction transverse to the toolbar wherein a plurality of harrow frames are mounted on the tool bar for movement therewith and wherein a plurality of ground engaging tines are adjustably mounted on each frame.

BACKGROUND

The conventional harrow includes a harrow frame being pivotally mounted at a forward end on a transverse tool bar to extend generally rearward therefrom. A plurality of tine support bars are mounted on the frame parallel to the tool bar having a plurality of harrow tines mounted spaced apart thereon for engaging the ground. The tine support bars are mounted for rotation about respective longitudinal axes for varying a tine angle relative to the ground.

A known method of varying tine angle is to provide an actuator bar mounted on the frame for longitudinal movement thereon. A plurality of cranks are mounted on the respective tine support bars for connecting to the actuator bar such that displacement of the actuator bar rotates the tines in unison. When varying tine angle however, the height of the frame from the ground also requires adjustment otherwise the frame will be suspended from the toolbar at an increasingly downward incline as the tines are displaced from a vertical position. The resulting harrowing action will not be distributed evenly among the tines. Adjustment of the frame height generally requires an adjustment separate from the tine angle and requires additional tools to accomplish.

SUMMARY

According to the present invention there is provided a harrow comprising:

an elongate tool bar;

a plurality of wheels supporting the tool bar on the ground for movement in a working direction perpendicular to the tool bar; and a plurality of harrow elements mounted on the tool bar to extend generally rearward therefrom in a substantially horizontal plane for movement therewith in the working direction;

each harrow element comprising;

a pair of support arms pivotally mounted spaced apart on the tool bar, the support arms extending generally rearward therefrom;

a frame pivotally mounted on a rear end of the support arms towards a rearward end of the frame such that the frame is pivotal about an axis extending through the rear ends of the support arms;

a hanger connected between the front end of the frame and the support arms for suspending the front end of the frame from the support arms;

a plurality of tine support bars mounted on the frame transversely to the working direction, the tine support bars being spaced apart across the frame, each tine support bar having a plurality of tines mounted thereon, the tines being spaced apart along the tine support bars, each tine being mounted at an upper end on the tine support bar to extend generally downward to a ground engaging end, the tine support bar being supported for rotational movement relative to the frame for varying a tine angle relative to the ground; and a coupling connected between the hanger and the tine bars, the coupling being arranged to adjust a height of the front end of the frame relative to the support arms in response to tine angle adjustment.

Preferably there is provided an actuator arm mounted transversely to the tine support bars on the frame for longitudinal movement relative to the frame and a crank mounted on each tine support bar, each crank being connected to the actuator arm such that longitudinal displacement of the actuator arm rotates the tine support bars in unison.

A manual lever may be mounted on one of the actuator cranks to extend generally upward therefrom for manually adjusting the tine angle.

When using an actuator arm, there may provided a collar mounted on the frame for slidably receiving the actuator arm therethrough, the collar having a number of apertures therein arranged for co-operation with a plurality of apertures in the actuator arm such that a locking member may be inserted therethrough for locking the actuator arm at various longitudinal position corresponding to different tine angles.

The coupling preferably comprises a rocker shaft mounted on the frame generally parallel to the tine support bars for rotation about a longitudinal axis, a first crank and a pair of second cranks mounted on the rocker shaft for rotation therewith, the first crank being connected to the actuator arm for rotating the rocker shaft with the tine support bars, the second cranks each mounting a support link on a free end thereof, the support links being mounted on the respective support arms such that rotation of the tines in a downward direction will rotate the free ends of the second cranks downward and raise the front end of the frame relative to the support arms.

There may be provided numerous mounting locations on the first crank, each mounting location being arranged to mount the actuator arm thereon corresponding to a different height of the front end of the frame relative to the rear end for adjusting fore-aft pressure on the tines.

There may be provided numerous mounting locations on the second cranks, each mounting location being arranged to mount the corresponding support link thereon corresponding to a different height of the front end of the frame relative to the rear end for adjusting fore-aft pressure on the tines.

The hanger preferably comprises a pair of support links mounted on the front end of the frame, each support link being slidably mounted at an upper end within a collar mounted on a corresponding one of the support arms, the support links having a tab on the upper end thereof above the collar for restricting downward movement of the front end of the frame relative to the support arms while permitting the front end to float upward relative to the support arms in response to elevation changes of the ground as the frame is displaced in the working direction.

There may be provided various mounting locations on the wheels for mounting the wheels at various heights in relation to the toolbar such that the harrow elements may be lowered as the tines wear.

Preferably the support arms each comprise a first portion extending upward and rearward from the tool bar to an upper end positioned above the front end of the frame and a second portion extending downward and rearward from the upper end of the first portion such that there is provided a clearance space between the frame and upper end permitting upward deflection of the front end of the frame.

The frame may comprise a pair of rails mounted substantially parallel and spaced apart to extend rearward from respective pivots on the tool bar, the rails being interconnected by at least two cross members extending therebetween, the support arms being mounted on respective rails at a position spaced towards the rear end of the frame.

There may be provided spring biasing means mounted between the support arms and the tool bar, the spring biasing means being arranged to urge the harrow element downward toward the ground.

When using spring biasing means, the spring biasing means preferably comprises a pair of upright plates mounted on the tool bar at a location corresponding to each support arm, the upright plates pivotally mounting the corresponding support arm therebetween towards a bottom end of the plates, the upright plates pivotally mounting a first end of a spring therebetween towards a top end, the spring extending downward and rearward to a second end mounted on the corresponding support arm spaced from the tool bar, the spring being mounted in compression for urging the harrow element downward.

Preferably the tool bar is mounted for pivotal movement about a longitudinal axis such that rotation of the tool bar will pivot the top end of the upright plates forward and rearward for respectively decreasing and increasing a force of compression of the spring for varying downward force on the tines.

BRIEF DESCRIPTION OF THE DRAWINGS

In the accompanying drawings, which illustrate an exemplary embodiment of the present invention.

DETAILED DESCRIPTION

Figure 1:
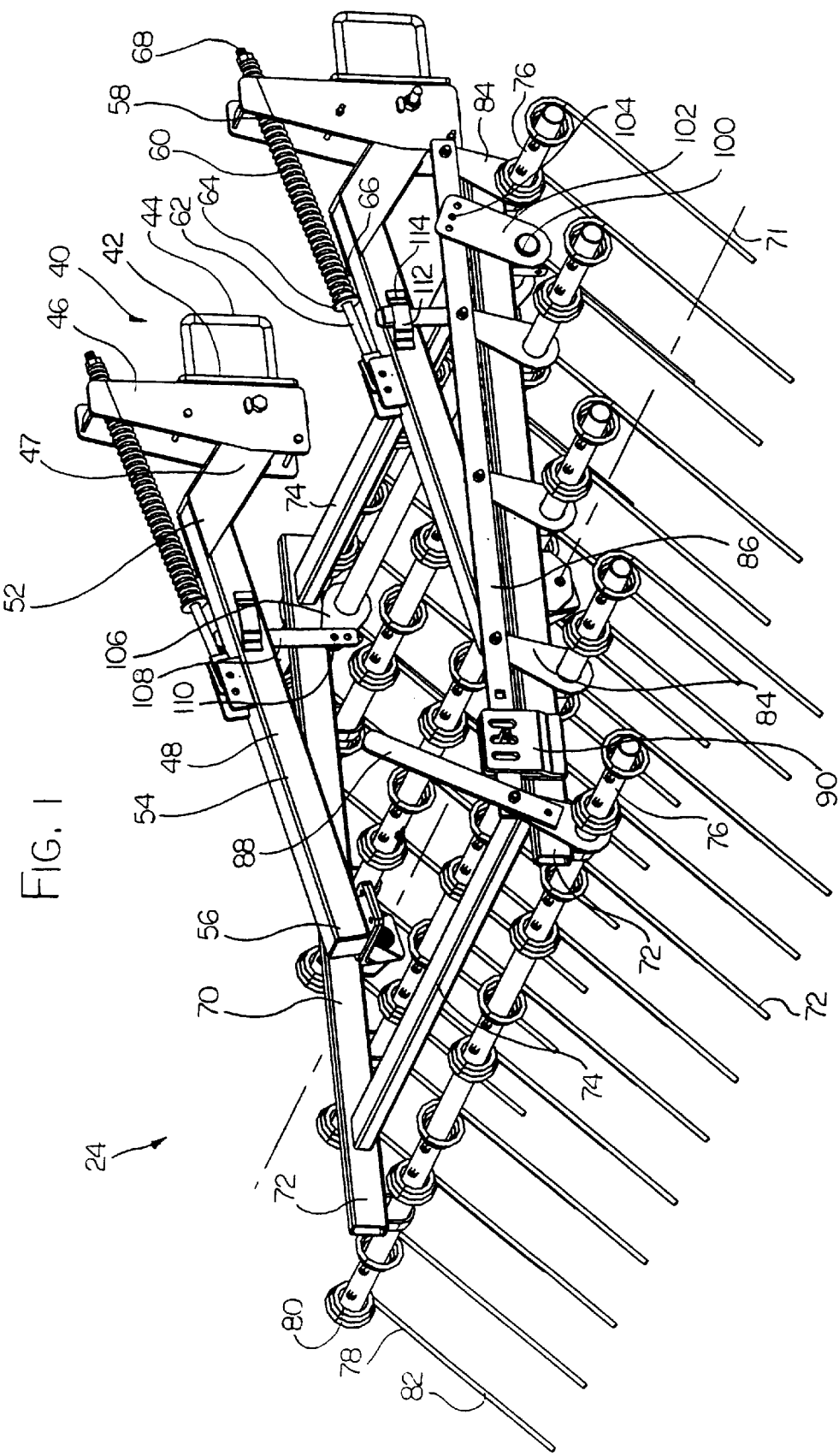
FIG. 1 is a isometric view of one of the harrow elements.
Figure 2:
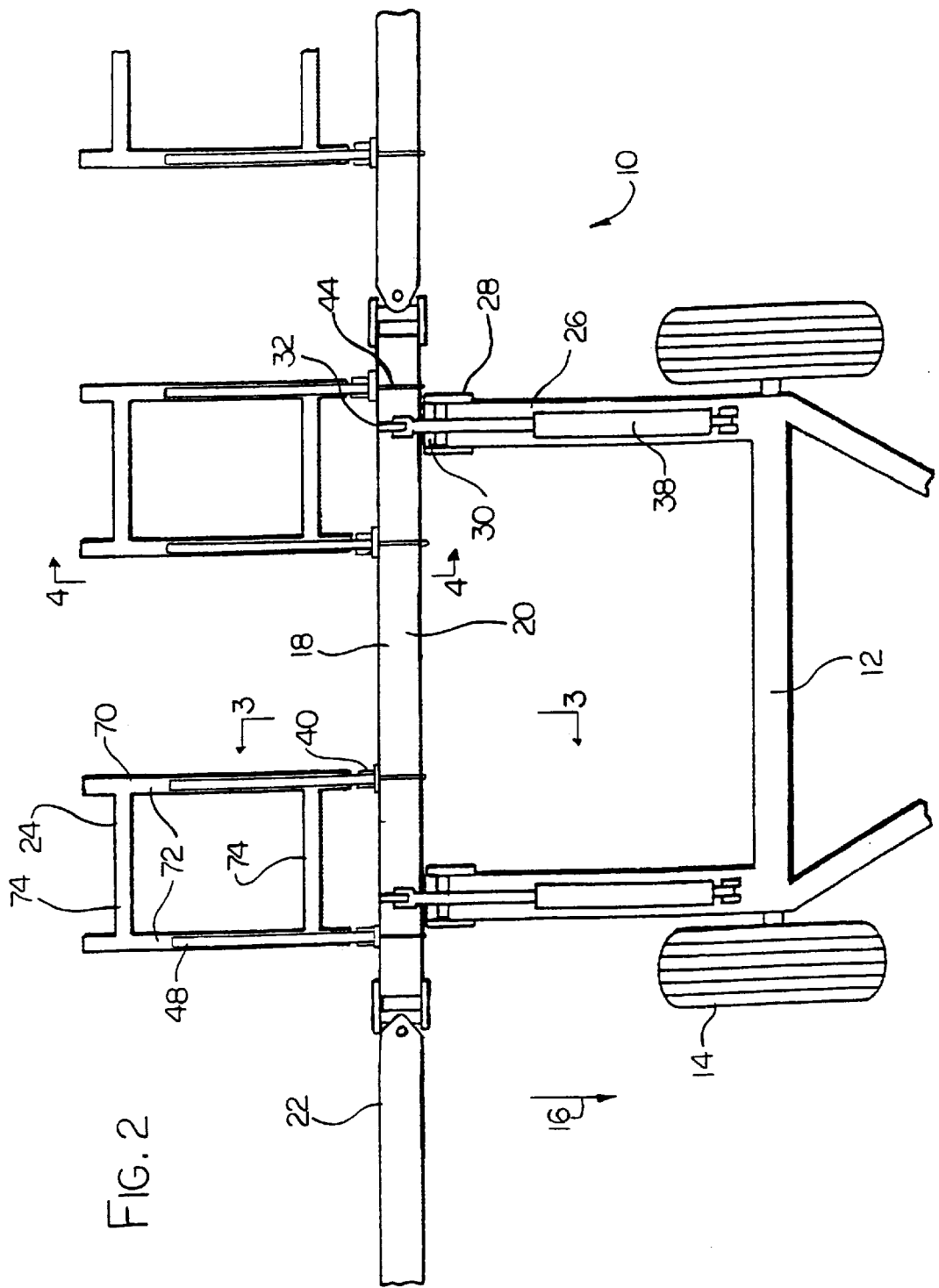
FIG. 2 is a top plan view of a main portion of the harrow with a plurality of harrow elements mounted thereon.
Figure 3:
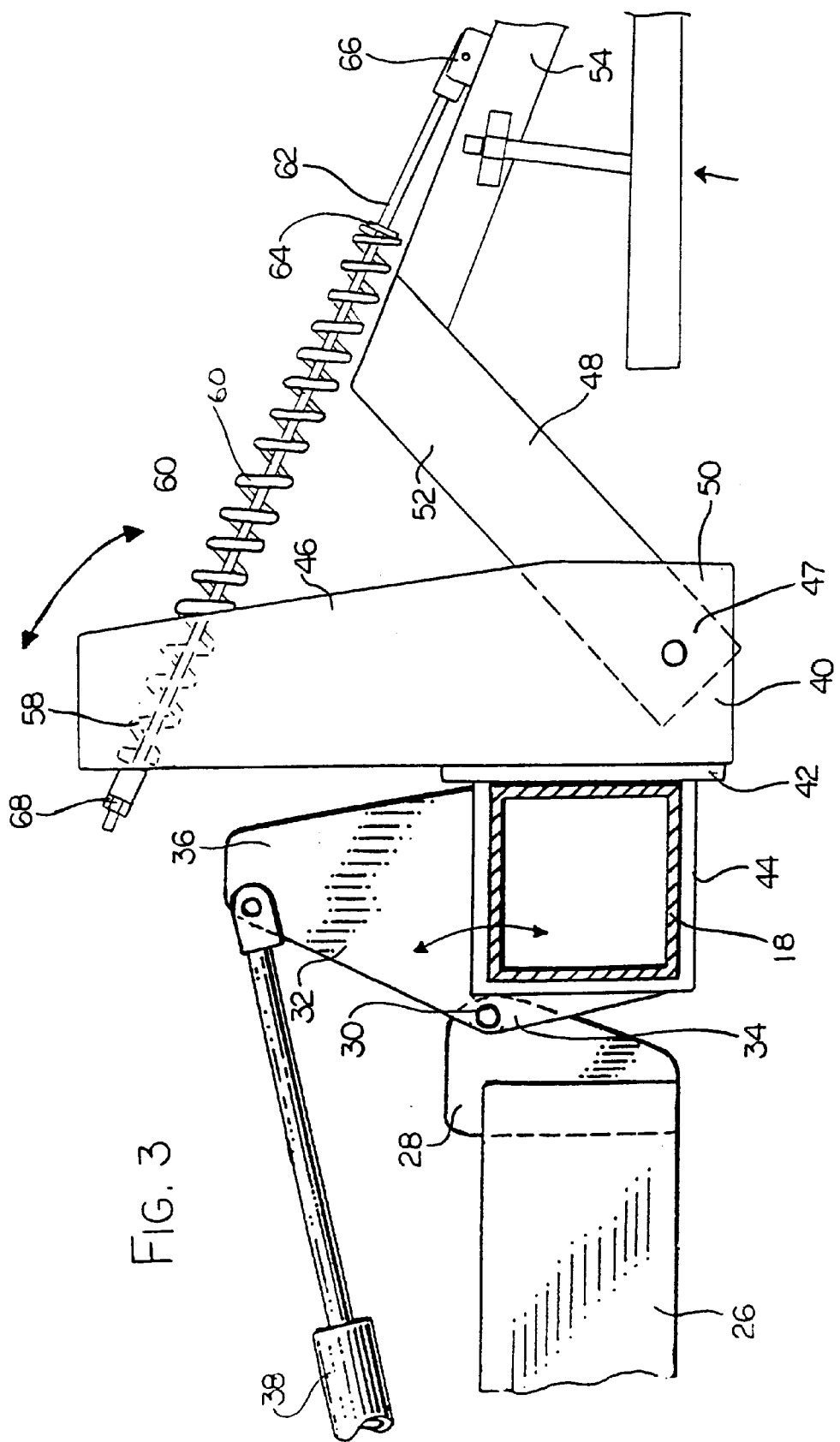
FIG. 3 is a side elevational view along the line 3—3 of FIG. 2.

Referring to the accompanying drawings, there is illustrated a harrow generally indicated by reference numeral 10. The harrow 10 includes a hitch frame 12 having a plurality of wheels 14 mounted thereon. The wheels 14 support the harrow for movement in a forward working direction 16. The hitch frame 12 is arranged to mount to a towing vehicle at a forward end.

The wheels 14 are adjustably mounted to one of many mounting locations such that a height of the frame 12 from the ground may be adjusted. Harrows are known to wear with time and lowering the frame relative to the wheels will adjust for this wear.

An elongate tool bar 18 is mounted on a rear end of the hitch frame perpendicular to the working direction. The elongate tool bar 18 is pivotally mounted on the frame for pivotal movement about a longitudinal axis. The tool bar 18 includes a main section 20 and a pair of end sections 22 coupled to respective ends of the main section. Each tool bar section 20 and 22 mounts a pair of harrow elements 24 thereon.

The hitch frame 12 includes a pair of support members 26 mounted spaced apart on the rear end of the frame to extend rearward in a horizontal plane. At a rearward end of each support member 26 is a pair of upright plates 28 mounted on opposing sides of the corresponding support member. A pivot pin 30 extends between each pair of upright plates 28 for pivotally mounting the tool bar thereon.

A pair of pivotal mounting plates 32 are mounted spaced apart on the main section of the tool bar for mounting onto the respective pivot pins 30. Each plate 32 lies in a vertical plane and includes a forwardly extending apex 34 and an upwardly extending portion 36. The forwardly extending apexes 34 mount the respective pivot pins 30 therethrough such that the tool bar is pivotal about an axis extending through the pivot pins 30.

A pair of hydraulic piston cylinders 38 are mounted at a cylinder end on the respective support members 26 spaced forward from respective rear ends of the support members. The hydraulic cylinders 38 are mounted at a piston end on a top end of the respective upwardly extending portions 36 of the pivot plates. Contraction and extension of the hydraulic piston cylinders 38 will pivot the tool bar upward and downward for varying a downward force on the harrow frame.

Each harrow element 24 includes a pair of pivot bases 40 mounted spaced apart on the tool bar The pivot bases 40 each include a rear mounting plate 42 secured to a rear face of the tool bar by a U-shaped bolt 44 arranged to extend around a circumference of the tool bar. A pair of upright mounting plates 46 are secured on each rear mounting plate 42 parallel and spaced apart from each other.

Each pivot base 40 pivotally mounts a forward end 47 of a support arm 48 between the upright mounting plates 46 near a bottom end 50 of the plates. In a working position, the support arms 48 each have a forward portion which extends upward and rearward from the forward end 47 to an upper end 52. A rearward portion 54 extends rearward and downward from the upper end 52 to a rearward end 56.

The upright mounting plates 46 extend upward past the tool bar 18 and the upper end 52 of the respective support arms for mounting a first end 58 of a spring 60 between each pair of plates. The springs 60 each include a rod 62 slidably mounted co-axially therethrough. The rod 62 is pivotally mounted on the corresponding support arm at a first end and extends past the spring at a second end. A radially extending flange 64 is mounted on the rod towards the first end and supports a second end 66 of the spring 60 thereon. A second end of the rod 62 is mounted in a bushing mounted between the upright mounting plates 46 and includes a nut 68 secured on the end thereof for restricting the second end of the rod from sliding inwardly past the first end of the spring. The springs 60 are mounted in compression for engaging the flanges 64 and urging the rods outwards thus urging the support arms downward.

A harrow frame 70 pivotally mounts towards a rear end thereof onto the support arms 48. The harrow frame is thus pivotal about an axis 71 which extends through the rearward end of both support arms 48.

The frame 70 includes a pair of parallel, spaced apart rails 72 which extend horizontally rearward. Each rail 72 is pivotally mounted on the rearward end of a corresponding support arm 48 using a ball and socket joint 73 for independent movement of the support arms to adjust to ground inclination. A pair of crossbars 74 are connected between the rails parallel to the toolbar for structural support.

A plurality of tine support bars 76 are mounted across a bottom face of the rails 72 parallel to the toolbar and extending past the rails at respective ends of the tine support bars. A plurality of tines 78 are mounted on the tine support bars spaced longitudinally along the tine support bars. Each tine 78 includes an upper coiled portion 80 fixed about the tine support bar and a lower ground engaging portion 82 extending therefrom.

The tine support bars 76 are mounted for rotation about respective longitudinal axes for adjusting a tine angle between each tine 78 and the ground. The tines 78 are thus rotatable together for either aggressive harrowing action when the tines extend vertically downward and numerous less aggressive harrowing actions when the tines extend downward at various rearward inclines.

A crank 84 is mounted on each tine support bar near one of the rails 72. The cranks 84 extend from respective tine support bars opposite the tines 78 to a free end. An actuator arm 86 is mounted across the free ends of the cranks 84 being pivotally mounted on each crank. The actuator arm 86 may thus be displaced longitudinally following an arc prescribed by the free ends of the cranks 84 such that the cranks 84 are rotated in unison in response to displacement of the actuator arm.

A manual lever 88 is mounted on the crank 84 which is nearest to the rearward end of the harrow frame. The lever 88 extends radially outward from the corresponding tine support bar for manually adjusting the tine angle in response to pivotal movement of the lever about an axis extending through the tine support bar.

A collar 90 is mounted on the rail 72 which is adjacent the cranks 84 towards the rearward end of the harrow frame. The collar 90 is arranged to receive the actuating arm therethough. The collar 90 is in the form of a pair of parallel, spaced apart and upright plates 92 mounted at a bottom end on the corresponding rail 72. A plurality of apertures 94 extend through the plates 92 for co-operation with a plurality of apertures 96 extending through the actuating arm 86. A locking pin 98 is inserted through a co-operating pair of the apertures 94 and 96 for locking the actuating arm in one of many fixed longitudinal positions corresponding to respective tine angles.

A rocker shaft 100 is mounted on the bottom face of the rails parallel to the tine support bars and spaced towards a forward end of the frame. The rocker shaft is mounted for rotation about a longitudinal axis and includes a first crank 102 mounted at one end of the rocker shaft near the cranks 84 for connecting to the actuating arm 86. The first crank 102 includes a plurality of mounting locations 104 at a free end for mounting to the first crank on the actuating arm at various relative positions therebetween.

The rocker shaft 100 also includes a pair of second cranks 106 mounted thereon adjacent an inner face of respective rails 72. The second cranks 106 extend radially outward from the rocker shaft to a free end. The free ends of the second cranks 106 mount a hanger thereon. The hanger comprises a pair of support links 108. Each support link 108 pivotally mounts on the free end of a corresponding second crank at a bottom end and slidably mounts on a corresponding one of the support arms at a top end.

The bottom end of the support links 108 include numerous mounting locations 110 for mounting the second cranks thereon at various relative positions therebetween. The top end of the support links 108 are inserted through respective collars 112 mounted on an outer side face of respective support arms for sliding movement in a generally vertical direction. A tab 114 secured to the top end of each support link 108 is located above the corresponding collar 112 for restricting the support link from being displaced downward while permitting free upward deflection of the front end of the frame and corresponding support links. The front end of the frame is permitted to deflect upwards for balancing the frame as the frame passes over irregularities in the ground surface as the harrow is displaced in the working direction.

In use, the harrow 10 is arranged such that the pressure of the tines on the ground is controlled using the hydraulic piston cylinders 38 for pivoting the tool bar which controls the amount of pressure the springs 60 provide. The support arms 48 are mounted towards the rear of the harrow frame such that more downward pressure is directed towards the rearward tines. The forward end of the frame is suspended from the support arms by the support links 108. The relative spacing between the forward end of the frame and the support arms determines the inclination of the frame and thus the ratio of pressure being applied between the forward mounted tines and the rearward mounted tines. This spacing is determined by the support links 108.

When the tine angle is adjusted, the relative height of the tines is affected and thus the height of the frame must also be adjusted when the tine angle is adjusted in order to preserve the same fore-aft tine pressure ratio. This is accomplished by coupling the support links 108 to the tine support bars 76. The coupling includes the rocker shaft 100, actuator arm 86 and a plurality of cranks 84, 102, 106 connected therebetween.

Figure 4:
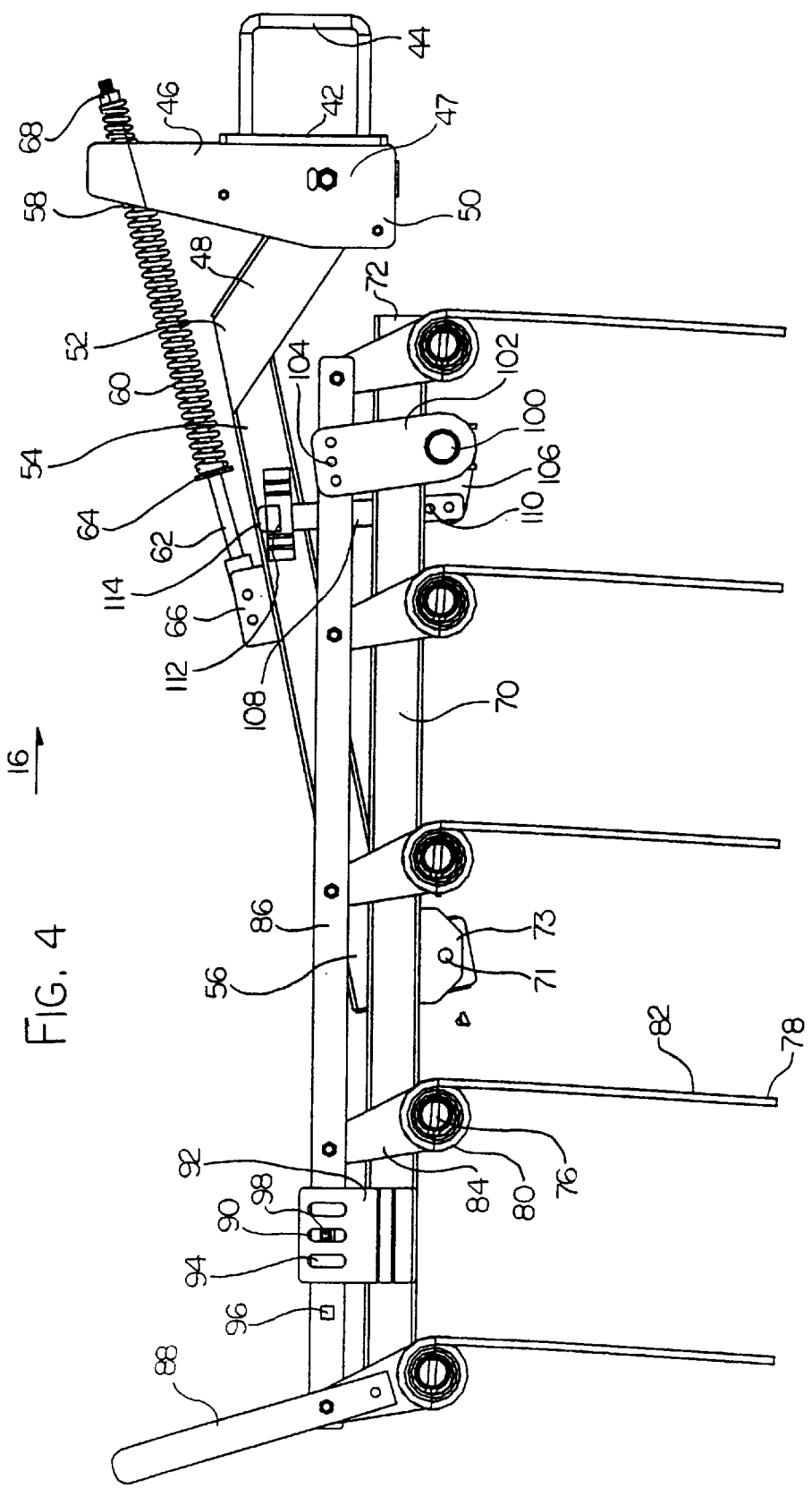
FIG. 4 is a side elevational view along the line 4—4 of FIG. 2.

As the tines 78 are adjusted towards a vertical position which is shown in FIG. 4, their relative height increases which requires the frame to be raised. Because the support arms 48 are free to pivot at each end the rear end of the frame is easily displaced upward by the tines and the pressure of the springs 60 is readjusted by pivoting the tool bar. The pressure applied to the forward tines is determined by the support links 108.

As the lever 88 is displaced rearward when the tines are adjusted, the actuator arm 86 is also displaced rearward for rotating the first and second cranks 102, 106 with the rocker shaft 100 in a counter clockwise direction as viewed in FIG. 4. The support links are displaced downward relative to the frame for raising the front end of the frame relative to the support arms. The fore-aft tine pressure ratio is thus preserved even when the tine angle is adjusted.

If the tines are displaced in the opposite direction towards an inclined position as shown in FIG. 1 the reverse will occur and the actuator arm is displaced forward thus rotating the cranks and rocker shaft. The bottom end of the support links are raised relative to the frame for suspending the front end of the frame lower in relation to the support arms thus also preserving the fore-aft tine pressure.

While one embodiment of the present invention has been described in the foregoing, it is to be understood that other embodiments are possible within the scope of the invention. The invention is to be considered limited solely by the scope of the appended claims.

What is claimed is:

1. A harrow comprising:
    an elongate tool bar;
    a plurality of wheels supporting the tool bar on the ground for movement in a working direction perpendicular to the tool bar; and
    a plurality of harrow elements mounted on the tool bar to extend generally rearward therefrom for movement therewith in the working direction;
    each harrow element comprising;
        a pair of support arms pivotally mounted spaced apart on the tool bar, the support arms extending generally rearward therefrom;
        a frame pivotally mounted on a rear end of the support arms towards a rearward end of the frame such that the frame is pivotal about an axis extending through the rear ends of the support arms;
        a hanger connected between a front end of the frame and the support arms for suspending the front end of the frame from the support arms;

a plurality of tine support bars mounted on the frame transversely to the working direction, the tine support bars being spaced apart across the frame, each tine support bar having a plurality of tines mounted thereon, the tines being spaced apart along the tine support bars, each tine being mounted at an upper end on the tine support bar to extend generally downward to a ground engaging end, each tine support bar being supported for pivotal movement relative to the frame about a respective tine axis extending longitudinally of the tine support bar;

a tine adjustment mechanism connected between the tine support bars such that displacement of the tine adjustment mechanism relative to the frame pivots the tine support bars in unison about the respective tine axes for adjusting an angle of the tines relative to the ground as the tine adjustment mechanism is displaced relative to the frame; and a coupling supporting the frame on the hanger, the coupling being pivotally mounted relative to the frame about a coupling aXis extending through the coupling;

the tine adjustment mechanism being connected to the coupling such that the coupling is arranged to be pivoted about the coupling axis as the tine adjustment mechanism is displaced relative to the frame to adjust a height of the front end of the frame relative to the support arms in response to adjusting the angle of the tines.

2. The harrow according to claim 1 wherein the tine adjustment mechanism comprises an actuator arm mounted transversely to the tine support bars on the frame for longitudinal movement relative to the frame and a crank mounted on each tine support bar, each crank being connected to the actuator arm such that longitudinal displacement of the actuator arm rotates the tine support bars in unison.

3. The harrow according to claim 2 wherein there is provided a manual lever mounted on one of the actuator cranks to extend generally upward therefrom for manually adjusting the tine angle.

4. The harrow according to claim 2 wherein there is provided a collar mounted on the frame for slidably receiving the actuator arm therethrough, the collar having a number of apertures therein arranged for co-operation with a plurality of apertures in the actuator arm such that a locking member may be inserted therethrough for locking the actuator arm at various longitudinal position corresponding to different tine angles.

5. The harrow according to claim 2 wherein there is provided a rocker shaft mounted on the frame generally parallel to the tine support bars for rotation about the coupling axis and a first crank mounted on the rocker shaft for rotation therewith, the first crank being connected to the actuator arm for rotating the rocker shaft with the tine support bars, the coupling comprising at least one second crank, each second crank mounting a support link on a free end thereof, each support link being mounted on one of the support arms such that rotation of the tines in a downward direction will rotate the free end of each second crank downward and raise the front end of the frame relative to the support arms.

6. The harrow according to claim 5 wherein there is provided a plurality of mounting locations on the first crank, each mounting location being arranged to mount the actuator arm thereon corresponding to a different height of the front end of the frame relative to the rear end for adjusting fore-aft pressure on the tines.

7. The harrow according to claim 5 wherein there is provided a plurality of mounting locations on each second crank, each mounting location being arranged to mount the corresponding support link thereon corresponding to a different height of the front end of the frame relative to the rear end for adjusting fore-aft pressure on the tines.

8. The harrow according to claim 1 wherein the frame comprises a pair of rails mounted substantially parallel and spaced apart to extend rearward from respective pivots on the tool bar, the rails being interconnected by at least two cross members extending therebetween, the support arms being mounted on respective rails at a position spaced towards the rear end of the frame.

9. The harrow according to claim 1 wherein there is provided spring biasing means mounted between the support arms of each harrow element and the tool bar, the spring biasing means being arranged to urge the harrow elements downward toward the ground.

10. The harrow according to claim 9 wherein the spring biasing means comprises a pair of upright plates mounted on the tool bar at a location corresponding to each support arm, the upright plates pivotally mounting the corresponding support arm therebetween towards a bottom end of the plates, the upright plates pivotally mounting a first end of a spring therebetween towards a top end, the spring extending downward and rearward to a second end mounted on the corresponding support arm spaced from the tool bar, the spring being mounted in compression for urging the go responding harrow element downward.

11. The harrow according to claim 10 wherein the tool bar is mounted for pivotal movement about a longitudinal axis such that rotation of the tool bar will pivot the top end of the upright plates forward and rearward for respectively decreasing and increasing a force of compression of the spring for varying downward force on the tines.

12. A harrow comprising:

an elongate tool bar supported for movement along the ground in a forward working direction extending transversely to the tool bar; and a plurality of harrow elements mounted on the tool bar to extend generally rearward therefrom for movement therewith in the forward working direction, each harrow element comprising;

a pair of support arms pivotally mounted spaced apart on the tool bar, the support arms extending generally rearward therefrom;

a frame pivotally mounted on a rear end of the support arms towards a rearward end of the frame such that the frame is pivotal about a axis extending through the rear ends of the support arms;

a plurality of line support bars mounted on the frame transversely to the working direction, the tine support bars being spaced apart across the frame, each tine support bar having a plurality of tines mounted spaced apart along the tine support bars at respective upper ends to extend generally downward to respective ground engaging ends, the tine support bars being supported for pivotal movement relative to the frame for varying a tine angle relative to the around; and a hanger comprising a pair of support links mounted on the front end of the frame, each support link being slid ably mounted at an upper end on a corresponding one of the support arms, the support links having a portion of increased dimension adjacent the upper end thereof arranged to engage the respective support arm for restricting downward movement of the front end of the frame relative to the support arms while permitting the front end to float upward relative to the support arms in response to elevation changes of the ground as the frame is displaced in the working direction.

13. A harrow comprising:

an elongate tool bar supported for movement along the ground in a forward working direction extending transversely to the tool bar; an a plurality of harrow elements mounted on the tool bar to extend generally rearward therefrom for movement therewith in the forward working direction, each harrow element comprising:

a pair of support arms pivotally mounted solaced apart on the tool bar, the support arms each comprising a first portion extending upward and rearward from the tool bar to an upper end and a second portion extending downward and rearward from the upper end of the first portion;

a frame pivotally mounted on a rear end of the support arms towards a rearward end of the frame such that the frame is pivotal about an axis extending through-the rear ends of the support arms, a front end of the frame being spaced below the upper end of the support arms such that there is provided a clearance space between the frame and the upper end of the support arms permitting upward deflection of the front end of the frame;

a plurality of tine support bars mounted on the frame transversely to the working direction, the tine support bars being spaced apart across the frame, each tine support bar having a plurality of tines mounted spaced apart along the tine support bars at respective upper ends to emend generally downward to respective ground engaging ends, the tine support bars being supported for pivotal movement relative to the frame for varying a tine anal relative to the ground; and a hanger connected between the front end of the frame and the support arms for suspending the front end of the frame from the support arms permitting the front end to float upward relative to the support arms in response to elevation changes of the ground as the frame is displaced in the working direction.

* * * * *